(12) United States Patent
Hiesener

(10) Patent No.: US 7,083,146 B2
(45) Date of Patent: Aug. 1, 2006

(54) SEATING ARRANGEMENT ESPECIALLY ADJOINING AN EMERGENCY EXIT IN AN AIRCRAFT PASSENGER CABIN

(75) Inventor: Stefan Hiesener, Tournefeuille (FR)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/786,649

(22) Filed: Feb. 24, 2004

(65) Prior Publication Data

US 2004/0195450 A1 Oct. 7, 2004

(30) Foreign Application Priority Data

Feb. 25, 2003 (DE) ................................ 103 07 870

(51) Int. Cl.
  *B64D 11/06* (2006.01)
  *B64D 13/00* (2006.01)
(52) U.S. Cl. ................. 244/118.6; 244/118.5; 244/122 R; 297/248; 297/331
(58) Field of Classification Search .. 244/118.5–118.6, 244/122 R, 137.2, 14.331; 297/14, 331, 297/232, 335, 362.13, 411.32, 411.36, 248, 297/257, 249
See application file for complete search history.

(56) References Cited

U.S. PATENT DOCUMENTS

| | | | |
|---|---|---|---|
| 2,947,350 A * | 8/1960 | Davis | |
| 3,589,762 A * | 6/1971 | Henrikson | 297/324 |
| 3,594,037 A * | 7/1971 | Sherman | 297/14 |
| 3,762,766 A | 10/1973 | Barecki et al. | |
| 4,072,346 A * | 2/1978 | Schueler | |
| 4,157,797 A * | 6/1979 | Fox | 244/122 R |
| 4,460,215 A * | 7/1984 | Chamberlain et al. | 297/14 |
| 4,527,828 A * | 7/1985 | Groce et al. | 297/14 |
| 4,536,027 A * | 8/1985 | Brennan | 244/122 R |
| 4,679,749 A * | 7/1987 | Ryan et al. | 244/122 R |
| 4,799,632 A * | 1/1989 | Baymak et al. | 244/122 R |
| 4,902,069 A * | 2/1990 | Lehnert | 297/14 |
| 5,431,360 A * | 7/1995 | Yu | 244/122 R |
| 5,829,836 A * | 11/1998 | Schumacher et al. | 297/257 |

(Continued)

FOREIGN PATENT DOCUMENTS

DE 10214104 12/2003

(Continued)

OTHER PUBLICATIONS

Federal Aviation Regulation Sec. 121.310.*

*Primary Examiner*—Teri Pham Luu
*Assistant Examiner*—Joshua Michener
(74) *Attorney, Agent, or Firm*—W. F. Fasse; W. G. Fasse

(57) ABSTRACT

A seating arrangement in an aircraft passenger cabin includes rows of seats, one behind another at a prescribed seat pitch. A wider transverse aisle is formed between successive seat rows at a normal exit or an emergency exit. At least one seat row bordering on and facing the transverse aisle is equipped with foldable passenger seats that each have an upwardly tiltable seat bottom and armrests. By tilting up the seat bottom and the armrests, an enlarged width of the transverse aisle is provided in the event of an emergency evacuation. In normal operation, the prescribed transverse aisle width does not need to be maintained, i.e. can be reduced, so the seat bottom and armrests are tilted down into the normal-use position for a passenger to be seated on the seat. Thereby the seat pitch of this seat row can be reduced and the total seating capacity can be increased.

16 Claims, 3 Drawing Sheets

U.S. PATENT DOCUMENTS

| | | | |
|---|---|---|---|
| 5,918,937 A * | 7/1999 | Moffa et al. | 297/331 |
| 6,776,457 B1 * | 8/2004 | Muin et al. | 297/331 |
| 2003/0209929 A1 | 11/2003 | Muin et al. | |

FOREIGN PATENT DOCUMENTS

| | | | |
|---|---|---|---|
| FR | 2 692 223 A1 * | 12/1993 | 244/122 R |

* cited by examiner

SEATING ARRANGEMENT ESPECIALLY ADJOINING AN EMERGENCY EXIT IN AN AIRCRAFT PASSENGER CABIN

PRIORITY CLAIM

This application is based on and claims the priority under 35 U.S.C. §119 of German Patent Application 103 07 870.3, filed on Feb. 25, 2003, the entire disclosure of which is incorporated herein by reference.

FIELD OF THE INVENTION

The invention relates to a seat row arrangement in a passenger cabin of a commercial passenger transport aircraft that is laid out with plural rows of passenger seats one behind another at a specified row spacing or seat pitch in the aircraft longitudinal direction. A crosswise or transverse aisle is formed by a larger row spacing between seat rows adjacent to an emergency exit to facilitate passenger access to the exit in an evacuation.

BACKGROUND INFORMATION

Commercial passenger transport aircraft are typically equipped with passenger seat row arrangements including different seats and different seat spacings or pitches corresponding to the class division of the passenger cabin(s), for example in first class, business class, and tourist or economy class. The seat spacing or pitch in the respective class is typically a significant criterium for the total number of passengers that can be transported in a given aircraft. With a smaller seat pitch, a larger number of seat rows can be installed, and the maximum possible number of seat places can be increased.

On the other hand, various regulations prescribe a relatively large or wide spacing distance between neighboring seat rows adjacent to emergency exits or normal-use exits of the transport aircraft, in order to form a crosswise or transverse aisle (i.e. an aisle extending crosswise or transversely relative to the longitudinal axis of the aircraft) leading to the respective exit. The prescribed minimum width of this transverse access aisle leading to an emergency exit depends on the aircraft type, as well as the geometry and the evacuation capacity of the respective emergency exit. For example, in the case of a double exit, the minimum width of the transverse aisle is 36 inches, while the minimum width of the transverse aisle accessing a single emergency exit is 20 inches.

A sufficient width of the transverse aisle is absolutely necessary in order to enable a rapid and trouble-free flow of passengers to the emergency exit in the case of an emergency evacuation. In this regard, an emergency evacuation of a commercial passenger transport aircraft is to be carried out within 90 seconds. A transverse aisle that is too narrow makes it difficult for passengers to recognize the emergency exit path between the successive seat rows, and also makes accessing the exit more difficult. Especially in the case of an emergency evacuation, the passengers must be able to easily and rapidly access the emergency exit with sufficient passage space and without any obstacles or hindrances.

SUMMARY OF THE INVENTION

In view of the above, it is an object of the invention to provide a seating arrangement in an aircraft passenger cabin that enables and facilitates a safe and rapid emergency evacuation, whereby a transverse aisle leading to an emergency exit has a sufficient width for an evacuation, while simultaneously providing the highest possible total seating density with the greatest possible total number of seat places for the passenger transport. The invention further aims to avoid or overcome the disadvantages of the prior art, and to achieve additional advantages, as apparent from the present specification. The attainment of these objects is, however, not a required limitation of the invention.

The above objects have been achieved according to the invention in a seating arrangement in a passenger cabin of a passenger transport aircraft including successive seat rows arranged one behind the other at prescribed seat spacings in the longitudinal direction of the aircraft. The aircraft includes an exit, and the seating arrangement includes a transverse aisle bordered by at least one of the seat rows, e.g. formed by an enlarged seat spacing of the two neighboring seat rows adjoining the exit so as to provide an access to the exit. Particularly according to the invention, a seat row bordering on or flanking the transverse aisle is equipped with foldable passenger seats that each have a seat back and a seat bottom that can be tilted or folded upward relative to the seat back. This upwardly tiltable seat bottom of the respective foldable seat is oriented facing toward and borders on the transverse aisle. Thereby, the width of the transverse aisle is variable between a narrower width when the tiltable seat bottoms are in the downwardly tilted, substantially horizontal, normal seating position, and a larger width when the tiltable seat bottoms are tilted upwardly into an upright, substantially vertical, stowed position. The foldable seats may further include tiltable armrests that can be tilted downwardly to a substantially horizontal position or upwardly to a substantially vertical position, in a similar manner as the tiltable seat bottoms. Other areas of the passenger cabin away from the transverse aisle may be equipped with conventional non-foldable fixed passenger seats.

According to the invention, it is especially advantageous that the width of the transverse aisle is variable depending on the particular situation, i.e. depending on the position of the tiltable seat bottoms of the foldable passenger seats. Thus, during normal operation of the aircraft, the tiltable seat bottoms are deployed in the downwardly tilted, substantially horizontal seating position. In such a situation, there is no need for the increased width of the transverse aisle. The seats may be embodied either so that the seat bottoms remain in whichever position they have been placed manually, or so that the seat bottoms automatically tilt upwardly into the upright position. For example, each seat bottom can be spring-loaded about its pivot axis, so that it pivots upwardly under a spring bias whenever the respective seat is vacant, i.e. whenever no passenger is seated on the respective seat. Then, in an emergency evacuation situation, with the tiltable seat bottoms manually or automatically tilted upwardly, the available width of the transverse aisle is thereby increased, which enables a rapid and safe evacuation of the aircraft. Furthermore, the increased width of the transverse aisle leading to the emergency exit also makes it easier to recognize the transverse aisle and its function as an escape path.

As a result, the previously necessary fixed width of a transverse aisle (e.g. the seat row pitch or spacing between the seat rows bordering the transverse aisle) can be reduced, because the inventive arrangement provides a variable width that is smaller for an increased seating capacity in normal operation, and larger for an improved evacuation function of the transverse aisle in the event of an emergency evacuation.

In this manner, the invention makes it possible to achieve an increased total passenger seating capacity while maintaining the same evacuation safety. Alternatively, the inventive arrangement can increase the evacuation safety with an increased transverse aisle width in the event of an emergency evacuation, while maintaining the same passenger seating capacity that would be provided by conventional fixed seats. Furthermore, the invention can even achieve a balance of both of the preceding advantages, namely both an increase of the total seating capacity and an increase of the width of the transverse aisle in the event of an emergency evacuation.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

Figure 1:
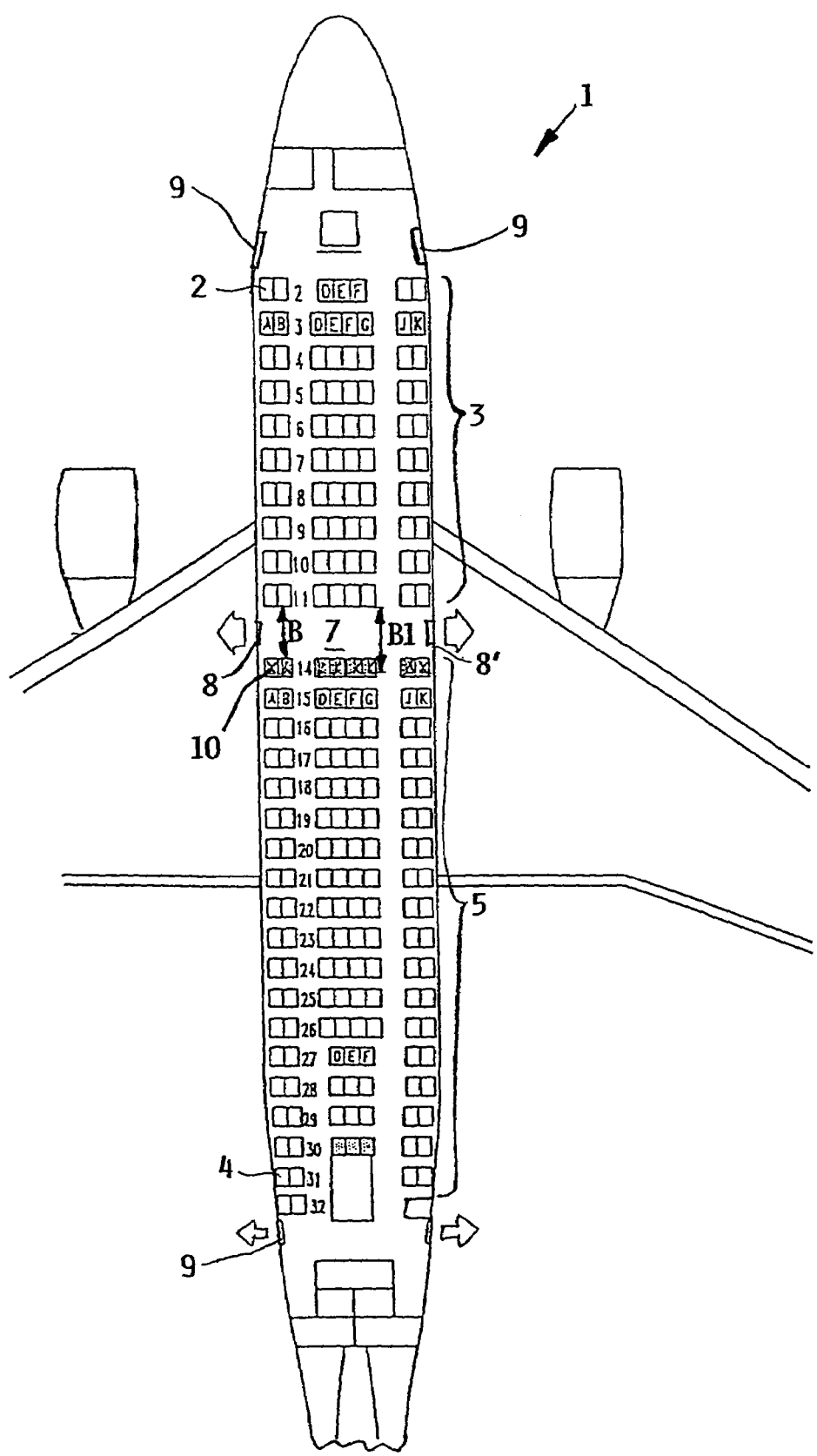
FIG. 1 is a schematic plan view of a cabin layout of a passenger transport aircraft including a seat row arrangement according to the invention.

FIG. 1 schematically shows a cabin layout of a passenger transport aircraft. The passenger cabin 1 includes a business class 3 equipped with business class seat rows 2 in the forward portion of the aircraft, as well as a tourist or economy class 5 equipped with tourist or economy class seat rows 4 in the aft portion of the aircraft. As can be seen, the seat spacing or pitch in the aircraft longitudinal direction is larger for the business class seat rows 2 than the tourist class seat rows 4.

Furthermore, a transverse aisle 7 is formed between successive seat rows, in this example particularly between the business class seat rows 2 and the tourist class seat rows 4. This transverse aisle 7 extends transversely or crosswise relative to the aircraft longitudinal direction, and leads to and provides access to two emergency exits 8 and 8' on opposite sides of the aircraft. For this purpose, the transverse aisle 7 is characterized by a rather large seat spacing or pitch (larger than the normal seat pitches) between the successive adjoining or neighboring seat rows. Particularly, such a transverse aisle 7 must have a sufficient width (in the longitudinal direction of the aircraft) in order to ensure a rapid unobstructed flow of passengers through the transverse aisle 7 to the emergency exits 8 or 8' in the event of an emergency evacuation.

According to the invention, the seat row 10 that directly borders on and faces the transverse aisle 7 is equipped with foldable seats 20, which will be described in further detail below in connection with FIG. 4. Generally, each one of these seats 20 includes a typical seat back and a tiltable seat bottom that can be tilted downwardly into a seating position and tilted upwardly into an upright stowed position. In the illustration of FIG. 1, the seat bottoms of the foldable seats of the row 10 are tilted downwardly into the seating position, whereby the transverse aisle 7 has a width B in the longitudinal direction of the aircraft. This width is measured as the clear unobstructed distance between the front edge of the seats of the row 10 and the rear edge of the next neighboring row of seats in the forward direction, i.e. on the opposite side of the transverse aisle 7.

Figure 2:
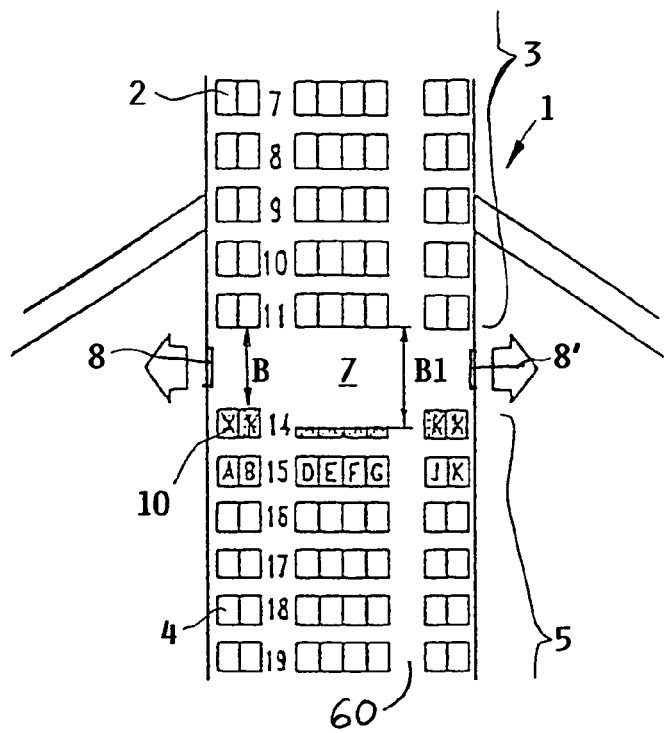
FIG. 2 is an enlarged view of the cabin layout with a first embodiment of a seat row arrangement according to the invention in the area of a transverse aisle leading to emergency exits.

The enlarged view of FIG. 2 shows the example situation in which the center seating group of the row 10 of foldable seats 20 has been changed from the normal seating configuration to the emergency evacuation configuration, i.e. in which no passengers are seated in these seats. In this situation, the seat bottoms as well as the armrests have been tilted upwardly into the upright stowed positions, whereby the width of the transverse aisle 7 has been enlarged to the increased evacuation width B1. It should be understood that in the event of an evacuation all of the foldable seats in this row 10 (namely not only the center seating group, but also the respective side seating groups), would be vacated, so that all of these seats would be folded with the seat bottoms and armrests tilted upwardly, so that the entire transverse length of the transverse aisle 7 would consistently have the enlarged evacuation width B1. Such an enlarged width of the transverse aisle 7 can significantly contribute to an improved and more-rapid evacuation of passengers in the event of an emergency, whereby the safety of the passengers is increased.

While FIG. 2 shows the particular example of providing the row 10 of foldable seats 20 adjoining the transverse aisle 7 at the emergency exits 8 and 8', it is further possible according to the invention to provide such foldable seats adjacent to the transverse aisle leading to the normal exits 9, as well. Still further, it is possible according to the invention to arrange such a foldable seat at each aisle seat position directly along the two opposite sides of each longitudinal aisle 60 in the cabin 1, while arranging fixed non-foldable seats elsewhere (e.g. at window and center seat positions). In this manner, with an appropriate arrangement of the foldable seats along the longitudinal aisle 60 as well as along the transverse aisle 7 and the normal boarding and deplaning area adjoining the normal exits 9, a further improvement of the free space and mobility for the passengers can be achieved.

Figure 3:
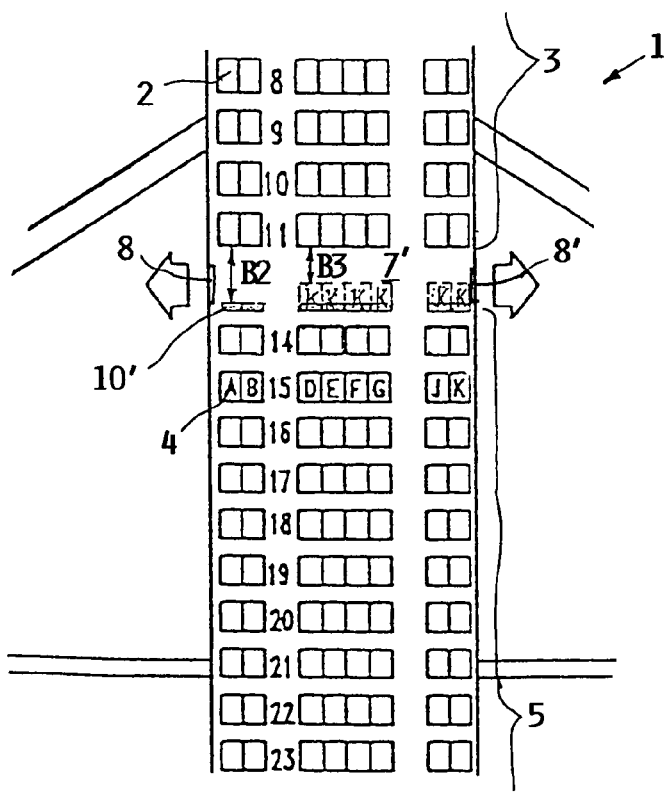
FIG. 3 is an enlarged view of the cabin layout similar to the view of FIG. 2, but showing a second embodiment of a seat row arrangement according to the invention in the area of the transverse aisle leading to the emergency exits.

FIG. 3 shows an enlarged detail of an alternative cabin layout in the area of a transverse aisle 7' leading to the emergency exits 8 and 8'. In comparison to the arrangement of FIG. 2, an extra or additional seating row 10' has been installed in the cabin in the area of the transverse aisle 7' in comparison to the transverse aisle 7 of FIG. 2. In this arrangement, when the foldable seats of the row 10' are folded, i.e. the seat bottoms and armrests are tilted upwardly into the upright stowed position, a sufficient prescribed evacuation width B2 of the transverse aisle 7' is provided. When the seats are folded or stowed in this manner, they only slightly diminish the available width of the transverse aisle that would have been available without this additional seat row 10'. On the other hand, when the foldable seats of the row 10' are in the normal use position, i.e. the seat bottoms and armrests are tilted downwardly into the seating position, then a reduced width B3 of the transverse aisle 7' results, which corresponds to or is slightly larger than the free space and legroom between successive normal seat rows. This reduced aisle width B3 may be less than the regulatory prescribed evacuation aisle width, because the width B3 only pertains in non-emergency situations. In this manner, the row spacing or pitch between the successive seat rows bordering opposite sides of the transverse aisle 7' may be the same as the normal (e.g. first class) seat pitch, or e.g. ≦33% or ≦25% larger than the normal seat pitch. In this manner, the total available seating capacity in the aircraft can be increased, in comparison to the conventional arrangement of fixed seats.

The tilting of the seat bottoms and armrests can be carried out manually or automatically when the passengers have left their seats, for example in the case of an emergency evacuation. This can be achieved by spring-biasing each seat bottom to pivot upward when it is vacant, or by means of actuators that actuate the automatic tilting of vacant seat bottoms when triggered by the aircraft crew in the event of an emergency evacuation. Otherwise, the seats are in the downwardly tilted position, whereby the transverse aisle 7' has the reduced width B3.

Figure 4:
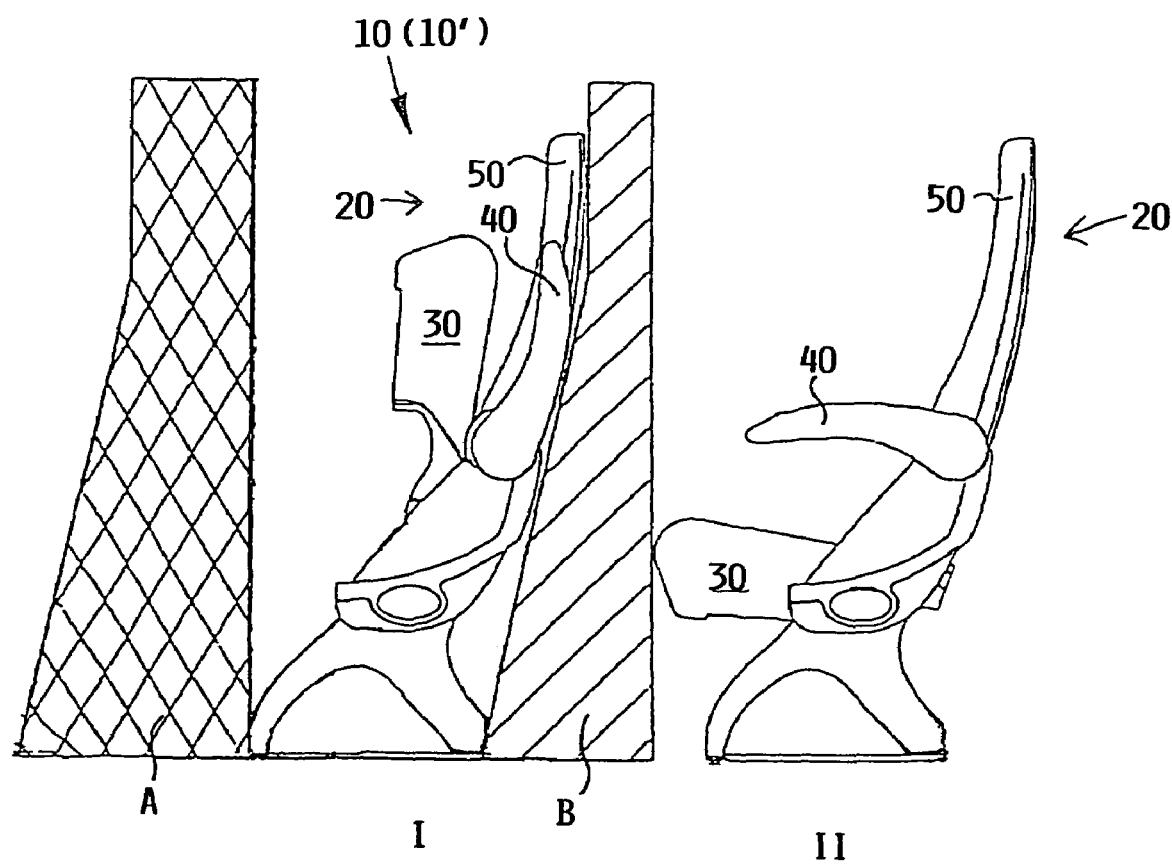
FIG. 4 is a schematic side view of the two conditions of a foldable passenger seat that can be used in the inventive seat row arrangement.

FIG. 4 shows a side view of a seat row 10 or 10' using foldable passenger seats 20 according to the invention. Each foldable passenger seat 20 includes a seat back 50, tiltable armrests 40 pivotally mounted to the seat back 50 or a frame of the seat, and a tiltable seat bottom 30 pivotally mounted to the seat back 50 or the frame of the seat. In this regard, the foldable passenger seats 20 can be constructed and embodied, for example, as disclosed in German Patent DE 102 14 104 C1, published on Dec. 11, 2003, and corresponding US Patent Application Publication US 2003/0209929A1, published on Nov. 13, 2003, the entire disclosures of which are incorporated herein by reference. These two patent publications are not prior art against the present application, in view of the present application's foreign priority date of Feb. 25, 2003.

FIG. 4 shows two different positions of the foldable seat 20. Namely, in the stowed position I shown at the left of FIG. 4, it can be seen that a larger free space A for the transverse aisle 7 or 7' is available, with the seat bottom 30 and the armrest 40 respectively tilted upwardly into the upright stowed positions. The increased free space A is in comparison to the smaller free space B that is available between successive seat rows when the foldable seat 20 is in its normal use position II as shown at the right in FIG. 4. Namely, in the normal use position II, the seat bottom 30 and the armrest 40 are tilted downwardly into the substantially horizontal normal-use position, whereby the arising free space B may correspond to the free space that is typically available in connection with a conventional fixed passenger seat arranged with the conventional fixed seat spacing or pitch. While FIG. 4 shows two successive rows of foldable seats 20 for illustrating the two positions thereof, and the resulting different free space, an actual seat row arrangement according to the invention would generally not include two rows of foldable seats in succession in this manner, but rather would be arranged as described otherwise herein.

In view of the present disclosures, it is apparent that the use of foldable passenger seats 20 at least for the seat rows 10 or 10' adjoining and facing a transverse aisle 7 or 7' leading to the emergency exits 8 and 8' or the normal exits 9, is advantageous, because it can gain additional free space in the area of the transverse aisle to facilitate the evacuation of passengers in the event of an emergency, and/or makes it possible to increase the total seating capacity within the passenger cabin 1.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In a passenger transport aircraft having a passenger cabin that has an exit and that is equipped with plural rows of passenger seats arranged spaced apart one behind another at prescribed seat spacings in a longitudinal direction of said aircraft, and a transverse aisle extending transversely relative to said longitudinal direction and leading to said exit along one of said rows of passenger seats, an improved seating arrangement wherein:

said exit is an emergency exit, said row of passenger seats along which said transverse aisle extends is a row of foldable passenger seats that each comprise a seat back and a tiltable seat bottom which is tiltable relative to said seat back between a normal seating position and an upright stowed position, said row of foldable passenger seats is arranged with said tiltable seat bottoms thereof bordering on and facing toward said transverse aisle, a width of said transverse aisle bounded by said row of foldable passenger seats in said longitudinal direction is variable with a relatively larger width when said tiltable seat bottoms are respectively tilted to said upright stowed position and a relatively smaller width when said tiltable seat bottoms are respectively tilted to said normal seating position, said relatively larger width of said transverse aisle is equal to or exceeds a regulatory prescribed minimum aisle width for said transverse aisle leading to said emergency exit, and said relatively smaller width of said transverse aisle is less than said regulator prescribed minimum aisle width.

2. The seating arrangement in the passenger transport aircraft according to claim 1, wherein each one of said foldable passenger seats further comprises a tiltable armrest which is tiltable relative to said seat back between a normal use position and an upright stowed position.

3. The seating arrangement in the passenger transport aircraft according to claim 2, wherein said seat bottom extends substantially horizontally in said normal seating position and substantially vertically in said upright stowed position thereof, and wherein said armrest extends substantially horizontally in said normal use position and substantially vertically in said upright stowed position thereof.

4. The seating arrangement in the passenger transport aircraft according to claim 1, wherein said seat bottom extends substantially horizontally in said normal seating position and substantially vertically in said upright stowed position thereof.

5. The seating arrangement in the passenger transport aircraft according to claim 1, wherein said seat bottom of each respective one of said foldable passenger seats is automatically tiltable from said normal seating position to said upright stowed position when said respective foldable passenger seat is vacant.

6. The seating arrangement in the passenger transport aircraft according to claim 1, wherein said seat bottom of each respective one of said foldable passenger seats is automatically tiltable from said normal seating position to said upright stowed position when said respective foldable passenger seat is vacant and an emergency evacuation of said passenger cabin is necessary.

7. The seating arrangement in the passenger transport aircraft according to claim 1, wherein said transverse aisle is an emergency evacuation aisle leading to said emergency exit.

8. The seating arrangement in the passenger transport aircraft according to claim 7, wherein said aircraft further includes a normal-use exit in addition to said emergency exit, with a normal-use transverse aisle for boarding and deplaning of passengers leading to said normal-use exit, and wherein said seating arrangement further comprises an additional row of said foldable passenger seats arranged with said tiltable seat bottoms thereof bordering on and facing toward said normal-use transverse aisle.

9. The seating arrangement in the passenger transport aircraft according to claim 8, wherein said passenger seats other than said foldable passenger seats, at locations other than in said rows along said transverse aisles, are non-foldable passenger seats respectively having non-tiltable fixed seat bottoms.

10. The seating arrangement in the passenger transport aircraft according to claim 7, wherein said passenger seats other than said foldable passenger seats, at locations other than in said row along said transverse aisle, are non-foldable passenger seats respectively having non-tiltable fixed seat bottoms.

11. The seating arrangement in the passenger transport aircraft according to claim 1, wherein said passenger seats other than said foldable passenger seats, at locations other than in said row along said transverse aisle, are non-foldable passenger seats respectively having non-tiltable fixed seat bottoms.

12. The seating arrangement in the passenger transport aircraft according to claim 1, wherein said passenger cabin further has a longitudinal aisle extending in said longitudinal direction between groups of said rows of said passenger seats on two opposite sides of said longitudinal aisle, and wherein said seating arrangement further includes respective individual ones of said foldable passenger seats arranged directly adjacent to said longitudinal aisle respectively in said rows of said passenger seats in said groups on said opposite sides of said longitudinal aisle.

13. The seating arrangement in the passenger transport aircraft according to claim 12, wherein said passenger seats that are not directly adjacent to said longitudinal aisle or to said transverse aisle are respective non-foldable passenger seats respectively having non-tiltable fixed seat bottoms.

14. The seating arrangement in the passenger transport aircraft according to claim 1, wherein said seat spacings of said rows of said passenger seats correspond to a standard prescribed seat pitch, and said row of foldable passenger seats is also spaced at said standard prescribed seat pitch relative to a neighboring one of said rows of said passenger seats on an opposite side of said transverse aisle.

15. The seating arrangement in the passenger transport aircraft according to claim 1, wherein said seat spacings of said rows of said passenger seats correspond to a standard prescribed seat pitch, and said row of foldable passenger seats is spaced from a neighboring one of said rows of passenger seats on an opposite side of said transverse aisle at a special pitch that is no more than 25% larger than said standard prescribed seat pitch.

16. The seating arrangement in the passenger transport aircraft according to claim 1, wherein said seat spacings of said rows of said passenger seats correspond to a standard prescribed seat pitch, and said row of foldable passenger seats is spaced from a neighboring one of said rows of passenger seats on an opposite side of said transverse aisle at a special pitch that is no more than 33% larger than said standard prescribed seat pitch.

\* \* \* \* \*

UNITED STATES PATENT AND TRADEMARK OFFICE
CERTIFICATE OF CORRECTION

PATENT NO. : 7,083,146 B2  
APPLICATION NO. : 10/786649  
DATED : August 1, 2006  
INVENTOR(S) : Hiesener Page 1 of 1

It is certified that error appears in the above-identified patent and that said Letters Patent is hereby corrected as shown below:

Column 6,
Line 36, after "said", replace "regulator" by --regulatory--.

Signed and Sealed this

Sixth Day of March, 2007

JON W. DUDAS  
*Director of the United States Patent and Trademark Office*